United States Patent
Carteri et al.

(10) Patent No.: US 9,840,381 B1
(45) Date of Patent: *Dec. 12, 2017

(54) AUGER TRANSFER CONVEYOR

(71) Applicant: Brandt Agricultural Products Ltd., Regina (CA)

(72) Inventors: Jonathan Robert Carteri, Regina (CA); Chance Peutert, Belle Plaine (CA)

(73) Assignee: Brandt Agricultural Products Ltd., Regina, Saskatchewan (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/471,000

(22) Filed: Mar. 28, 2017

Related U.S. Application Data

(63) Continuation of application No. 15/178,915, filed on Jun. 10, 2016, now Pat. No. 9,643,787.

(51) Int. Cl.
| | |
|---|---|
| *B65G 33/18* | (2006.01) |
| *B65G 69/28* | (2006.01) |
| *B65G 33/10* | (2006.01) |
| *B65G 47/18* | (2006.01) |
| *B65G 33/14* | (2006.01) |

(52) U.S. Cl.
CPC .......... *B65G 69/28* (2013.01); *B65G 33/10* (2013.01); *B65G 33/18* (2013.01); *B65G 47/18* (2013.01)

(58) Field of Classification Search
CPC ........ B65G 33/18; B65G 33/10; B65G 33/14; B65G 33/34; B65G 67/24
USPC ........................................ 198/663, 666, 668
See application file for complete search history.

(56) References Cited

U.S. PATENT DOCUMENTS

| | | | |
|---|---|---|---|
| 1,564,926 A | 12/1925 | Armstrong | |
| 2,134,365 A | 10/1938 | Hale | |
| 2,869,715 A | 1/1959 | Williams | |
| 4,813,839 A | 3/1989 | Compton | |
| 5,964,566 A | 10/1999 | Stewart et al. | |
| 6,966,740 B2 * | 11/2005 | Mast ...................... | B65G 47/18 414/537 |
| 6,976,819 B2 | 12/2005 | Kulbeth | |
| 7,090,066 B2 | 8/2006 | Kirsch | |
| 7,708,131 B2 | 5/2010 | Muth | |
| 8,662,285 B2 | 3/2014 | Jesse | |
| 9,643,787 B1 * | 5/2017 | Carteri ................. | B65G 33/18 |
| 9,676,569 B2 * | 6/2017 | Bodie ................... | B65G 33/18 |
| 9,701,481 B2 * | 7/2017 | Wilcox ............... | B65G 41/002 |
| 2005/0155845 A1 | 7/2005 | Webb | |

* cited by examiner

*Primary Examiner* — James R Bidwell
(74) *Attorney, Agent, or Firm* — Frost Brown Todd LLC

(57) ABSTRACT

An auger transfer conveyor apparatus for granular material has a conveyor body defined by side walls, a front wall, and a floor comprising a substantially horizontally oriented front floor section and an upward and rearward sloping rear floor section. A plurality of substantially parallel auger assemblies are provided, each with a substantially horizontal auger section extending along the front floor section, an inclined auger section extending along the sloping rear floor section to a transfer discharge at a top edge of the rear floor section, and a flexible joint connecting the horizontal auger section to the inclined auger section. The auger assemblies are open such that during operation granular material moves from the front wall toward the transfer discharge above and between the auger assemblies, and an auger drive is operative to rotate the auger assemblies.

2 Claims, 3 Drawing Sheets

AUGER TRANSFER CONVEYOR

This application is a continuation of and claims priority to U.S. patent application Ser. No. 15/178,915, filed Jun. 10, 2016, entitled "AUGER TRANSFER CONVEYOR," now U.S. Pat. No. 9,643,787, issued on May 9, 2017, the contents of which are incorporated herein by reference in its entirety for all purposes.

This disclosure relates to the field of conveyors and in particular a transfer conveyor for receiving granular material from a discharge, such as the discharge of a hopper bottom trailer.

BACKGROUND

Granular material such as grain and like agricultural products are commonly transported in trailers with hoppered compartments. The granular material is discharged through an opening in the bottom center of the trailer. To receive this discharged material a conveyor intake is located under the discharge opening. In permanent conveyor installations the trailer is commonly driven over a receiving pit and the material is directed to the conveyor intake.

In many industries however, such as agriculture, portable conveyors are used which are moved from location to location. These portable conveyors typically include a transfer conveyor with a conveyor intake located under the trailer discharge opening, and a conveyor discharge oriented to discharge into the intake of a main conveyor. One such common transfer conveyor is a swing auger pivotally attached to the main conveyor intake, such as disclosed in U.S. Pat. No. 8,662,285 to Jesse. The conveyor intake is provided by a receiving container with sides sloping to direct received material into one or more generally horizontal augers, which carry the material to an inclined auger which in turn carries the material to the main auger.

It is also known to configure the transfer conveyor intake such that the trailer drives over the intake to locate the trailer discharge over the intake. U.S. Pat. No. 5,964,566 to Stewart et al. discloses a drive-over transfer conveyor where the conveying mechanism is provided by a chain with paddles which provides a low profile to facilitate driving over the intake. U.S. Pat. No. 4,813,839 to Compton discloses a drive-over transfer conveyor where the conveying mechanism is provided by a belt which also provides a low profile.

U.S. Pat. No. 7,090,066 to Kirsch discloses a drive-over transfer conveyor where the conveying mechanism inside the receiving container is provided by a pair of augers, each with an open horizontal section extending along an intake hopper and an inclined section enclosed in an auger tube and connected to the horizontal section by a universal joint. The inclined sections both discharge into an enclosed auger with a significantly larger diameter. The ramps of Kirsch are configured to fold up to provide a sufficient ramp length to allow a trailer to roll over the top of the receiving container which is higher than that of Stewart et al.

Since the capacity of an auger is related to its diameter, the augers in such transfer conveyors typically have a sufficiently large diameter to provide the desired capacity. Typically, there are two to three horizontal augers, each with a diameter of 6 inches or more.

Some products such as oilseeds and fertilizer are problematic for conveying with a belt conveyor. Oilseeds such as canola are very small and slippery and leak into various areas of the conveyor and build up a gummy accumulation on rollers and other parts. Some fertilizers react with rubber belting reducing belt life.

SUMMARY OF THE INVENTION

The present disclosure provides a transfer conveyor apparatus that overcomes problems in the prior art.

The present disclosure provides an auger transfer conveyor apparatus for granular material. The apparatus comprises a conveyor body defined by right and left side walls, a front wall, and a floor comprising a substantially horizontally oriented front floor section and an upward and rearward sloping rear floor section. There is a plurality of substantially parallel auger assemblies, each auger assembly comprising a substantially horizontal auger section extending along the front floor section, an inclined auger section extending along the sloping rear floor section to a transfer discharge at a top edge of the rear floor section, and a flexible joint connecting the horizontal auger section to the inclined auger section. The auger assemblies are open such that during operation granular material moves from the front wall toward the transfer discharge above and between the auger assemblies, and an auger drive is operative to rotate the auger assemblies.

The present disclosure provides a simple and economical transfer conveyor apparatus that can be provided in a stand-alone configuration. The inclined auger sections are closely spaced and are open, not enclosed by tubes or covered with plates such that granular material such as grain moves up the sloping rear wall in a wave that is significantly higher than the auger sections themselves. The transfer conveyor apparatus can be combined with a main conveyor to form a high capacity receiving transfer conveyor with a low profile suitable for a drive over configuration.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
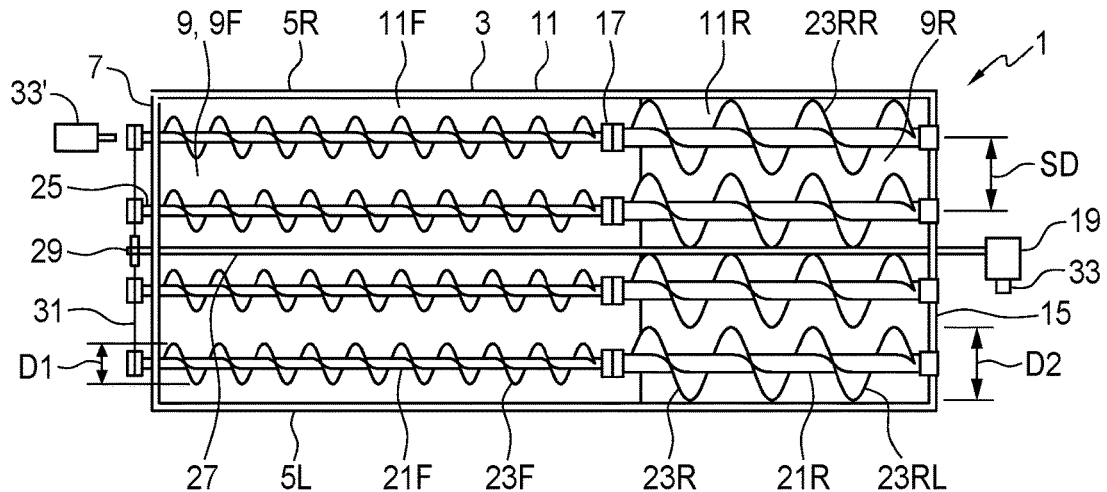
FIG. 1 is a schematic top view of an embodiment of an auger transfer conveyor apparatus of the present disclosure.
Figure 2:
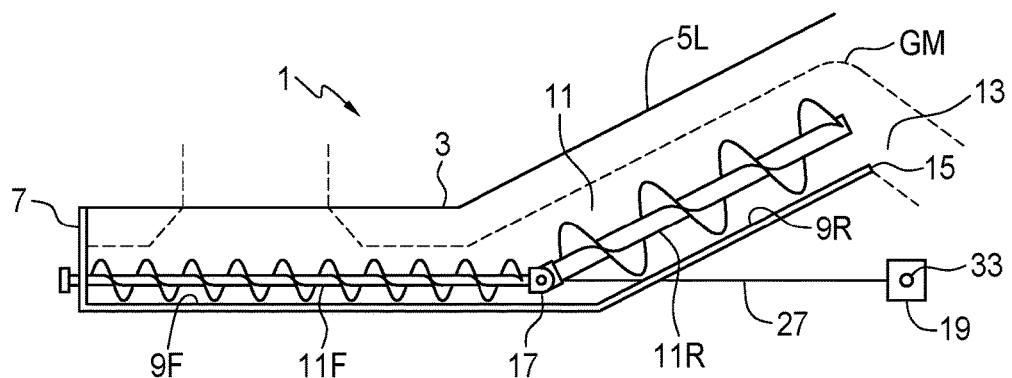
FIG. 2 is a schematic side view of the embodiment of FIG. 1.

FIGS. 1 and 2 schematically illustrate an embodiment of an auger transfer conveyor apparatus 1 of the present disclosure for granular material. The apparatus comprises a conveyor body 3 defined by right and left side walls 5R, 5L, a front wall 7, and a floor 9 comprising a substantially horizontally oriented front floor section 9F and an upward and rearward sloping rear floor section 9R.

As illustrated the right and left side walls 5R, 5L slope upward and rearward to follow the rear floor section 9R. The rear portions of the right and left side walls 5R, 5L are also higher in order to contain the greater depth of granular material above the rear floor section 9R.

A plurality of substantially parallel auger assemblies 11 each comprises a substantially horizontal auger section 11F extending along the front floor section 9F, an inclined auger section 11R extending along the sloping rear floor section 9R to a transfer discharge 13 at a top edge 15 of the rear floor section 9R, and a flexible joint 17, such as a universal joint connecting the horizontal auger section 11F to the inclined auger section 11R. An auger drive 19 is operative to rotate the auger assemblies 11.

The auger assemblies 11 are open such that during operation granular material moves from the front wall 7 toward the transfer discharge 13 above and between the auger assemblies 11. The phantom line GM in FIG. 2 indicates generally the level of granular material in the apparatus 1 considerably above the inclined auger sections 11R during operation.

Each horizontal auger section 11F has a horizontal auger shaft 21F and a horizontal auger flight 23F extending from the horizontal auger shaft 21F, and the horizontal auger flight 23F has a horizontal auger flight diameter D1. Similarly, each inclined auger section 11R has an inclined auger shaft 21R and an inclined auger flight 23R extending from the inclined auger shaft 21R, and the inclined auger flight 23R has an inclined auger flight diameter D2.

In the illustrated apparatus 1 the inclined auger flight diameter D2 is greater than the horizontal auger flight diameter D1. The right inclined auger flight 23RR is in proximity to and parallel to a rear portion of the right side wall 5R and the left inclined auger flight 23RL is in proximity to and parallel to a rear portion of the left side wall 5L. The inclined auger shafts 21R are substantially parallel and spaced apart by a spacing distance SD substantially equal to the inclined auger flight diameter D2 such that the edges of adjacent inclined auger flights 23R move along the same path.

The arrangement essentially fills the interior of the area between the right and left side walls 5R, 5L with rearward moving inclined auger flights 23 such that there are no dead spots where granular material can simply rest, and capacity is increased. A significant depth of granular material is generated above the inclined auger flights 23R during conveying operations.

Figure 3:
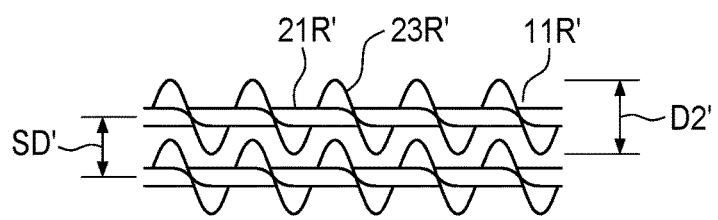
FIG. 3 is a schematic top view of an alternate arrangement of the inclined auger sections of the embodiment of FIG. 1 where the inclined auger flights overlap.

FIG. 3 schematically illustrates an alternate arrangement of the inclined auger sections 11R' where the inclined auger shafts 21R' are spaced apart by a spacing distance SD' that is less than the inclined auger flight diameter D2'. It is contemplated that moving the inclined auger shafts 21R' closer together as in FIG. 3 so the inclined auger flights 23R' overlap will provide more area of inclined auger flights 23R' moving rearward and upward along the rear floor section 9R and so increase capacity.

In the illustrated apparatus 1 the horizontal auger shafts 21F extend through the front wall 7 to forward ends 25 thereof located forward of the front wall 7, and the auger drive 19 is connected to the forward end 25 of each horizontal auger shaft 21F to drive each auger assembly 11. The auger drive 19 comprises a drive shaft 27 extending through the rear floor section 9R substantially parallel to and between two of the horizontal auger sections 11F and through the front wall 7 to a forward end 29 thereof, and a drive mechanism 31, such as chains, gears, or the like connects the forward end 29 of the drive shaft 27 to the forward end 25 of each horizontal auger shaft 21F. A motor 33 is connected to a rear end of the drive shaft 27 rearward of the rear floor section 9R.

Alternatively, as also illustrated in FIG. 1 in suitable situations the motor 33' can be located forward of the front wall and be connected by the drive mechanism 31 directly to the forward end 25 of each horizontal auger shaft 21F.

Figure 4:
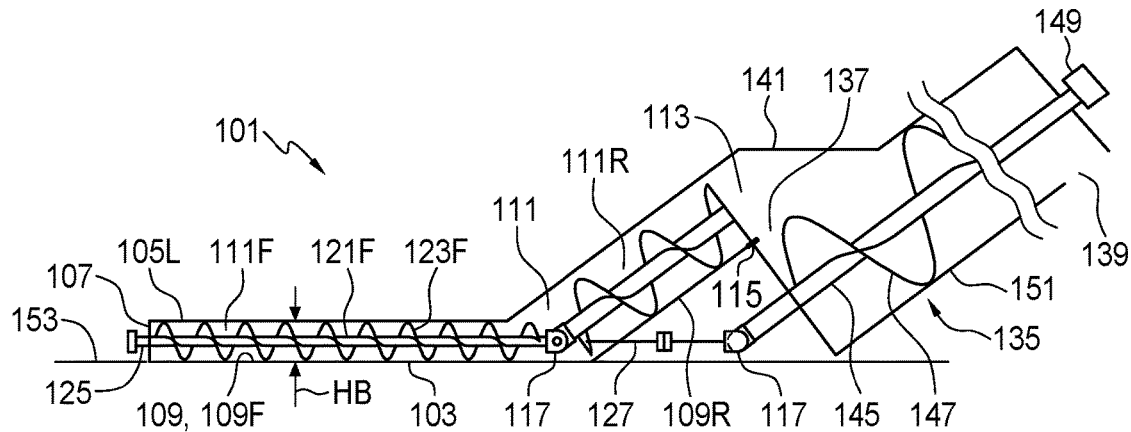
FIG. 4 is a schematic side view of a combination of an auger transfer conveyor apparatus similar to the embodiment of claim 1, connected to discharge into the intake of a main conveyor.
Figure 5:
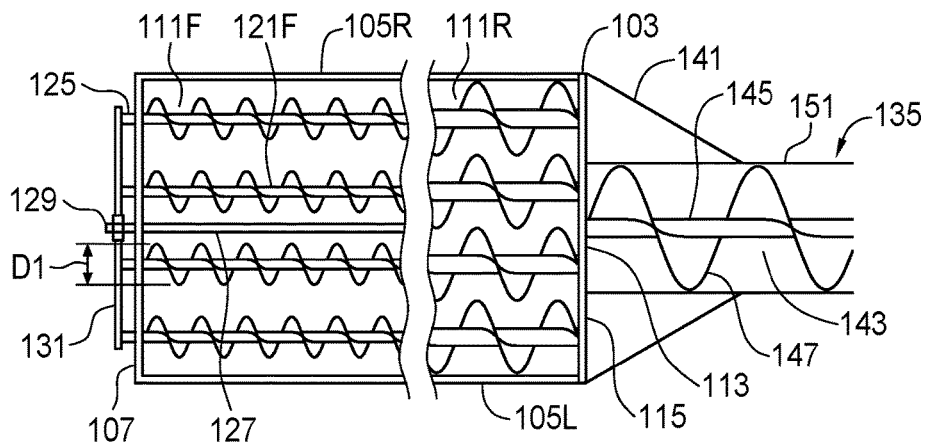
FIG. 5 is a schematic top view of front and rear ends of the combination shown in FIG. 4.

The auger transfer conveyor apparatus 1 is a stand-alone apparatus to which wheels, skids, and the like can be added to maneuver the apparatus 1 as required, or the apparatus 1 can simply be moved by a loader tractor or the like. FIGS. 4 and 5 schematically illustrate a combination transfer and main conveyor apparatus 101 of the present disclosure.

As in the apparatus 1 described above the apparatus 101 comprises a conveyor body 103 defined by right and left side walls 105R, 105L, a front wall 107, and a floor 109 comprising a substantially horizontally oriented front floor section 109F and an upward and rearward sloping rear floor section 109R. A plurality of substantially parallel auger assemblies 111 each comprises a substantially horizontal auger section 111F extending along the front floor section 109F with the horizontal auger shafts 121F thereof extending through the front wall 107 to forward ends 125 thereof located forward of the front wall 107. The auger assemblies 111 each comprise as well an inclined auger section 111R extending along the sloping rear floor section 109R to a transfer discharge 113 at a top edge 115 of the rear floor section 109R, and a flexible joint 117, such as a universal joint, connecting the horizontal auger section 111F to the inclined auger section 111R.

A main conveyor 135 is connected to the rear floor section 109R of the conveyor body 103 and slopes rearward and upward from the transfer discharge 113. A main intake 137 of the main conveyor 135 is configured to receive granular material from the transfer discharge 113 and convey the granular material to a main discharge 139. In the illustrated apparatus 101 the transfer discharge 113 includes a chute 141 configured to receive granular material carried to the top edge 115 of the rear floor section 109R and direct the granular material into the main intake 137.

The main conveyor 135 could be of any type and in the illustrated apparatus 101 the main conveyor is an auger conveyor comprising a main auger 143 with a main auger shaft 145 and a main auger flight 147 extending from the main auger shaft 145 and a main auger drive 149 located at an upper end of the main auger 143 rotates the main auger shaft 145. The lower end of the main auger shaft 145 is connected through flexible joints 117 to a drive shaft 127 extending through the rear floor section 109R of the conveyor body 103 substantially parallel to and between two of the horizontal auger sections 111F and through the front wall 107 to a forward end thereof, and a drive mechanism 131 connects the forward end 129 of the drive shaft 127 to the forward end 125 of each horizontal auger shaft 121F.

The main auger 143 is enclosed in a main auger tube 151 and the apparatus 101 is configured such that a bottom of the main auger tube 151 and the front floor section 109F of the conveyor body 103 rest on the ground 153, and the conveyor discharge 113 is located at the top of the main auger tube 151. Thus in the apparatus 101, granular material is only moved vertically a short distance, less than the diameter of the main auger tube 151, compared to conventional swing augers where the vertical distance moved is much greater. This relatively short vertical lift allows the open inclined auger section 111R to move significant amounts of granular material with no tube enclosing the augers.

The height HB of the conveyor body 103 is only slightly larger than the horizontal auger flight diameter D1, and so by using horizontal auger sections 111F with relatively small diameters, such as between about 3.5 and 4.5 inches, the height HB can be reduced to make it easier for trailer wheels to roll over the conveyor body 103 in a drive-over type transfer conveyor.

Figure 6:
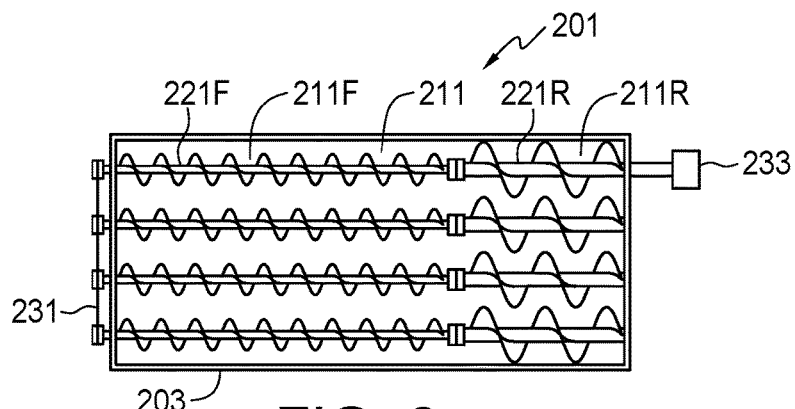
FIG. 6 is a schematic top view of an alternate embodiment of an auger transfer conveyor apparatus of the present disclosure where the augers are driven by a motor connected to a rear end of one of the inclined auger shafts.

FIG. 6 schematically illustrates an alternate auger transfer conveyor apparatus 201 where a motor 233 is connected to a rear end of the inclined auger shaft 221R of a selected auger assembly 211, and wherein the drive mechanism 231 connects the forward end of the horizontal auger shaft 221F of the selected auger assembly 211 to the forward end of each other horizontal auger shaft 211.

Figure 7:
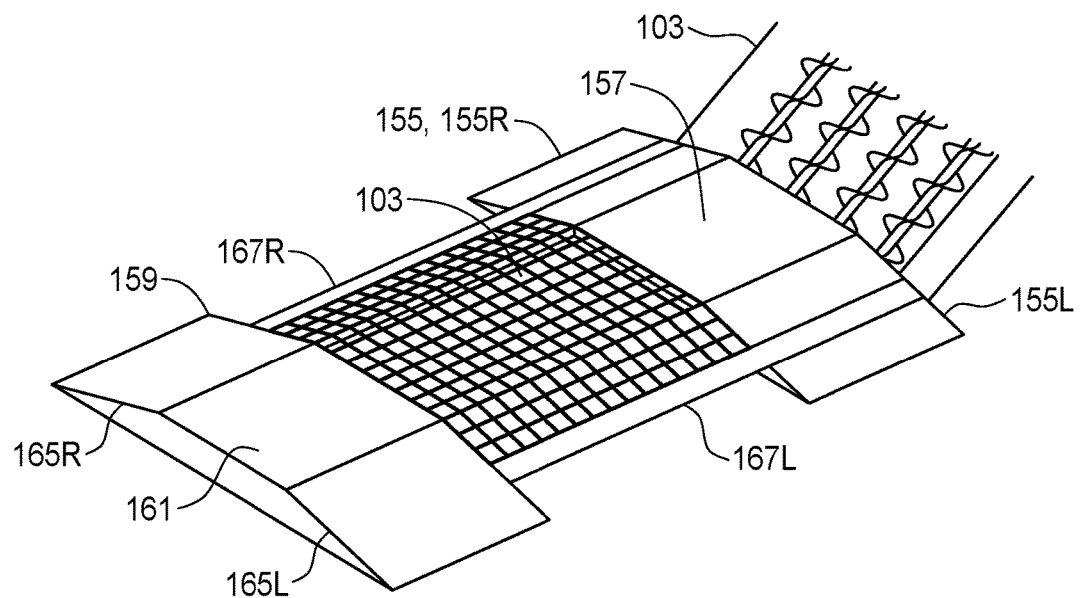
FIG. 7 is a schematic perspective view of the conveyor body of the combination of FIG. 1 with hopper extensions, ramps, and a grate installed thereon for using the embodiment of FIG. 1 as a drive-over transfer conveyor and where the hopper extensions, ramps, and grate are in a lowered drive-over position.
Figure 8:
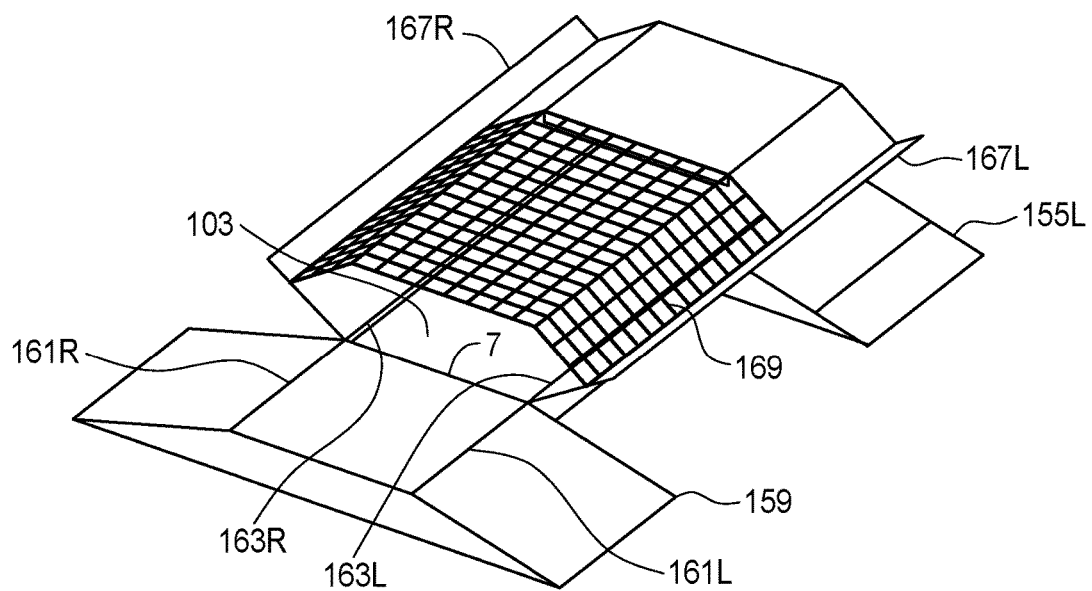
FIG. 8 is a schematic perspective view of the receiving hopper of FIG. 6 where the hopper extensions, ramps, and grate are in a raised operating position

FIGS. 7 and 8 schematically illustrate the conveyor body 103 with right and left rear ramps 155R, 155L sloping downward and outward from rear portions of the corresponding right and left side walls 105R, 105L of the conveyor body 103 just forward of where the floor transitions from the horizontal front floor section to the inclined rear floor section. A wheel support member 157 extends over the conveyor body 103 aligned with the right and left rear ramps 155 and is configured to support the wheels of a loaded trailer passing over the conveyor body 103. Because granular material is carried in something like a wave above the horizontal auger sections 111F there is a considerable depth of granular material above the horizontal auger sections 111F at the rear end of the conveyor body 103 where the wheel support member 157 is located. Thus it is necessary that the wheel support member 157 be movable from the lowered drive-over position illustrated in FIG. 7, to a raised operating position shown in FIG. 8 where same does not interfere with the flow of granular material.

A front ramp apparatus 159 is attached to a front end of the conveyor body 103, and comprises a top plate 161 with right and left edges 161R, 161L substantially aligned with the top edges 163R, 163L of the right and left side walls of the conveyor body 103, and right and left front ramps 165R, 165L sloping downward and outward from the right and left edges 161R, 161L of the top plate 161. The front ramp apparatus 159 is outside the conveyor body 103 and so can remain in the same position during drive-over or conveying operations.

To contain the depth of granular material that is generated above the horizontal auger sections 111F during conveying operations, right and left hopper extension plates 167R, 167L are pivotally attached to the top edges 163R, 163L of the right and left side walls. The right and left hopper extension plates 167R, 167L extend rearward from the front wall 7 of the conveyor body 103 and are movable from a lowered drive-over position resting on the corresponding right and left rear ramps 155 as seen in FIG. 7, to a raised operating position sloping upward and outward from the top edges 163R, 163L of the corresponding right and left side walls.

Typically, a grate 169 for safety will extend over the middle portion of the conveyor body 103 where the discharge of a hoppered trailer will be located. This grate 169 is also movable from a lowered drive-over position substantially aligned with top edges 163R, 163L of the right and left side walls as seen in FIG. 7, to a raised operating position as seen in FIG. 8. Conveniently as shown, the grate 169 and the wheel support member 157 are pivotally attached to the right and left hopper extension plates 167R, 167L and move with the right and left hopper extension plates 167R, 167L from the lowered drive-over position of FIG. 6 to the raised operating position of FIG. 8.

The present disclosure provides a simple and economical transfer conveyor apparatus 1 that can be provided in a stand-alone configuration or combined with a main conveyor to form a high capacity receiving transfer conveyor with a low profile suitable for a drive over configuration.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:
1. A transfer conveyor apparatus for granular material, the apparatus comprising:
a conveyor body defined by right and left side walls, a front wall, and a floor;
a conveyor assembly mounted in the conveyor body and operative to transfer granular material from the conveyor body to a conveyor discharge at a rear end of the conveyor body;
right and left rear ramps sloping downward and outward from rear portions of the corresponding right and left side walls;
a wheel support member extending over the conveyor body aligned with the right and left rear ramps, the wheel support member movable from a lowered drive-over position, to a raised operating position;
a front ramp apparatus attached to a front end of the conveyor body, the front ramp apparatus comprising a top plate with right and left edges substantially aligned with the top edges of the right and left side walls, and right and left front ramps sloping downward and outward from the right and left edges of the top plate;
right and left hopper extension plates pivotally attached to the top edges of the right and left side walls and extending rearward from the front wall of the conveyor body, the right and left hopper extension plates movable from a lowered drive-over position resting on the corresponding right and left rear ramps, to a raised operating position sloping upward and outward from the top edges of the corresponding right and left side walls; and
a grate over at least a portion of the conveyor body, the grate movable from a lowered drive-over position substantially aligned with top edges of the right and left side walls, to a raised operating position.
2. The apparatus of claim 1 wherein the grate and the wheel support member are pivotally attached to the right and left hopper extensions and move with the right and left hopper extensions from the lowered drive-over position to the raised operating position.

* * * * *